United States Patent
Park et al.

(10) Patent No.: US 6,828,266 B1
(45) Date of Patent: Dec. 7, 2004

(54) X7R DIELECTRIC COMPOSITION

(75) Inventors: Hyun Park, Victor, NY (US); Daniel E. McCauley, Watkins Glenn, NY (US); Mike S. H. Chu, Lewiston, NY (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 10/440,051

(22) Filed: May 16, 2003

(51) Int. Cl.$^7$ .............................................. C04B 35/468

(52) U.S. Cl. .................. 501/139; 361/321.4; 361/321.5

(58) Field of Search ................................ 501/137, 139; 361/321.4, 321.5

(56) References Cited

U.S. PATENT DOCUMENTS

| | | |
|---|---|---|
| 4,977,485 A | 12/1990 | Mori et al. |
| 5,010,443 A | 4/1991 | Maher |
| 5,036,425 A | 7/1991 | Omori et al. |
| 5,335,139 A | 8/1994 | Nomura et al. |
| 5,757,610 A | 5/1998 | Wada et al. |
| 5,852,542 A | 12/1998 | Wada et al. |
| 5,853,515 A | 12/1998 | Sano et al. |
| 5,879,812 A | 3/1999 | Nishiyama et al. |
| 6,185,087 B1 | 2/2001 | Park et al. |
| 6,723,673 B2 * | 4/2004 | Maher et al. ............... 501/138 |
| 6,777,363 B2 * | 8/2004 | Park et al. .................. 501/139 |

* cited by examiner

Primary Examiner—Karl Group
(74) Attorney, Agent, or Firm—Rankin, Hill, Porter & Clark LLP

(57) ABSTRACT

Multilayer ceramic chip capacitors which satisfy X7R requirements and which are compatible with reducing-atmosphere sintering conditions so that non-noble metals such as nickel, copper, and alloys thereof may be used for internal and external electrodes are made in accordance with the invention. The capacitors exhibit desirable dielectric properties (high capacitance, low dissipation factor, high insulation resistance), excellent performance on highly accelerated life testing, and very good resistance to dielectric breakdown. The dielectric layers preferably contain $BaTiO_3$ as the major component and $Mn_3O_4$, $Y_2O_3$, $Ho_2O_3$, $CaCO_3$, $SiO_2$, $B_2O_3$, $Al_2O_3$, MgO, and CaO as minor constituents. They are batched in a proportion that there are preferably present 99.00 to 98.5 wt. % $BaTiO_3$, 0.336 to 0.505 wt. % $Mn_3O_4$, 0.198 to 0.296 wt. % $Y_2O_3$, 0.132 to 0.198 wt. % $Ho_2O_3$, 0.199 to 0.299 wt. % $CaCO_3$, 0.057 to 0.085 wt. % $SiO_2$, 0.039 to 0.058 wt. % $B_2O_3$, 0.018 to 0.027 wt. % $Al_2O_3$, 0.016 to 0.025 wt. % MgO and 0.005 to 0.007 wt. % CaO. The $B_2O_3$, $SiO_2$, MgO, $Al_2O_3$, and CaO are preferably present in the form of pre-reacted glass. The preferred form of the invention may be sintered in the temperature range 1,200 to 1,300° C. in a reducing atmosphere. Additionally, a re-oxidation procedure may be utilized during the sintering cycle to optimize the resistance of the ceramic to dielectric breakdown.

16 Claims, 5 Drawing Sheets

X7R DIELECTRIC COMPOSITION

BACKGROUND OF THE INVENTION

1. Field of Invention

This invention relates to a barium titanate-based dielectric composition, and more particularly to a barium titanate-based dielectric composition that can be used to form multilayer ceramic chip capacitors having internal base metal electrodes formed of nickel or nickel alloys.

2. Description of Related Art

Multilayer ceramic chip capacitors have been widely utilized as miniature size, high capacitance, high reliability electronic parts. In accordance with increasing demands for smaller, high-performance electronic equipment, multilayer ceramic chip capacitors also have encountered more rigorous demands toward smaller size, higher capacitance, lower cost, and higher reliability.

Multilayer ceramic chip capacitors generally are fabricated by forming alternating layers of an internal electrode forming paste and a dielectric layer-forming paste. Such layers are typically formed by sheeting, printing, or similar techniques, followed by concurrent firing.

Generally, the internal electrodes have been formed of conductors such as Pd and Pd alloys. Although palladium is expensive, it can be partially replaced by the use of relatively inexpensive base metals such as Ni and Ni alloys. The term "base metal" is defined as any metal other than a metal of the precious metal groups (gold, silver, and platinum). Since internal electrodes of base metals become oxidized if fired in ambient air, the dielectric layers and internal electrode layers must be co-fired in a reducing atmosphere. Firing in a reducing atmosphere, however, causes the dielectric layers to be reduced, resulting in a lowering of resistivity. Multilayer ceramic chip capacitors using non-reducible dielectric materials have been proposed; however, such devices typically have a shorter life of insulation resistance (IR) and low reliability.

When the dielectric material is subject to a DC electric field, its relative dielectric constant (K) lowers with time. If thinner dielectric layers are used in order to provide chip capacitors of a smaller size and greater capacitance, application of DC voltages across the capacitor causes the dielectric layers to receive a more intense electric field, resulting in a greater change of dielectric constant (K) with time, that is, a greater change of capacitance with time. Such changes are undesirable in most applications.

Capacitors also are required to have good DC bias performance. The term "DC bias performance" (also referred to as the voltage coefficient of capacitance (VCC)) is defined as the rate of change of capacitance with a change in DC bias (voltage). The capacitance generally decreases as the applied DC electric field is increased. Capacitors having poor DC bias performance thus have the problem that when a DC electric field is applied across the capacitors during normal operation, capacitance drops to unacceptable levels.

The Electronic Industry Association (EIA) prescribes a standard for temperature coefficient of capacitance (TCC) known as the X7R characteristic. The X7R characteristic requires that the rate of change of capacitance be within ±15% (reference temperature 25° C.) over the temperature range −55° C. to 125° C.

Nomura et al., U.S. Pat. No. 5,335,139, discusses various prior art efforts to construct dielectric compositions. According to Nomura et al., one dielectric material known to meet the X7R characteristic is a composition of the $BaTiO_3$+$SrTiO_3$+$MnO$. This material, however, is said to experience a great change of capacitance with time under a DC electric field, for example, a capacitance change of −10% to −30% when a DC electric field of 50 volts is applied at 40° C. for 1,000 hours. This change fails to meet the X7R characteristic.

Nomura et al. further describe a multilayer ceramic chip capacitor having alternately stacked dielectric layers and internal electrode layers which may be formed of nickel or nickel alloy. In one embodiment, the dielectric layers contain barium titanate as a major component and magnesium oxide, manganese oxide, barium oxide and/or calcium oxide, silicon dioxide, and yttrium oxide as minor components in such proportion that there are present 0.1 to 3 moles of MgO, 0.05 to 1.0 mole of MnO, 2 to 12 moles of BaO+CaO, 2 to 12 moles of $SiO_2$ and up to 1 mole of $Y_2O_3$ per 100 moles of $BaTiO_3$. Nomura teaches that samples containing less than 0.1 mole magnesium oxide per 100 moles of $BaTiO_3$ fail to provide the desired temperature dependence of capacitance.

It is desirable to have yttrium oxide present in the ceramic composition to ensure high reliability, provide high resistance to dielectric breakdown, and prevent degradation. However, when yttrium oxide and magnesium oxide are both present in the composition, they tend to interact in a manner that causes the rate of change of capacitance to fall outside of the X7R characteristic at the high end of the temperature range, i.e., 125° C. It would thus be desirable to develop a composition that contains yttrium oxide but very low levels of magnesium oxide in order to form capacitors having high reliability and high resistance to DC voltage breakdown while meeting the X7R characteristic at 125° C.

The dielectric composition described in Park et al., U.S. Pat. No. 6,185,087, exhibits improved temperature characteristics. However, when it is used in large capacitance multilayer ceramic capacitors where the dielectric thickness is less than eight microns, the rate of capacitance change is out of EIA X7R specifications. Furthermore the addition of 0.1 to 5 mol percent of $SiO_2$ reduces the dielectric constant to less than 3000.

BRIEF SUMMARY OF THE INVENTION

The present invention provides a dielectric composition that can be used to make ceramic multilayer capacitors compatible with nickel and nickel alloys as the internal electrode material. Capacitors may be formed from the dielectric composition of the present invention in a broad range of firing temperatures and atmospheres, and exhibit a high dielectric constant with a small dielectric loss and excellent reliability under highly accelerated life testing conditions. Additionally, the capacitors can have dielectric layers of less than three microns, while exhibiting a low aging rate and superior temperature characteristics that meet the X7R specification of the EIA standard.

The dielectric composition of the present invention comprises a uniform dense microstructure of grains having an average diameter of about 0.4 microns based upon SEM analysis. The grains within the dielectric layers of the capacitors exhibit a type of core-shell structure after firing, wherein the inner core of the fired grains maintains a high dielectric constant. The core-shell structure of the grains is not a traditional core-shell structure, where a defined boundary exists between the core material and the material that comprises the shell. Instead, the material that comprises the shell diffuses into the grains of material comprising the core.

The grains of core material comprise a major portion of each dielectric layer, and the shell material diffuses into the spaces left between the grains. A concentration gradient is created within the dielectric layers, so that the concentration of the shell material is highest in the outer portion of the layers and between the grains of core material, and lowest at the dielectric core of the layers.

The dielectric composition of the present invention comprises barium titanate as a major component and manganese oxide, yttrium oxide, holmium oxide, calcium carbonate, silicon oxide, boron oxide, aluminum oxide, magnesium oxide and calcium oxide as minor components. Preferably, such components are present in the dielectric composition as follows: about 99.80 to about 90.00 wt. % $BaTiO_3$; about 0.067 to about 3.364 wt. % $Mn_3O_4$; about 0.040 to about 1.976 wt. % $Y_2O_3$; about 0.026 to about 1.320 wt. % $Ho_2O_3$; about 0.040 to about 1.993 wt. % $CaCO_3$; about 0.011 to about 0.567 wt. % $SiO_2$; about 0.008 to about 0.389 wt. % $B_2O_3$; about 0.004 to about 0.179 wt. % $Al_2O_3$; about 0.003 to about 0.164 wt. % MgO; and about 0.001 to about 0.047 wt. % CaO.

Multilayer chip capacitors are fabricated by alternately stacking dielectric layers and internal electrodes to form green chips. The compatible internal electrodes inside the multilayer chip capacitors are nickel or nickel alloys. The dielectric composition that forms the dielectric layers is produced by wet milling the components of the dielectric with a binder system. The dielectric composition is placed on a polyester film, coating the film and forming sheets, which are alternately stacked with electrodes to form the green chips.

After the green chips are formed, the binder is removed in air at a temperature less than 300° C. Once the binder is removed, the green chips are then fired in a reducing atmosphere of wet nitrogen and hydrogen at the temperature of from about 1200° C. to about 1300° C. in an atmosphere having oxygen partial pressure $10^{-8}$ to $10^{-12}$ atm. The green chips are then re-oxidized in an atmosphere having oxygen content in the range of 6 to 60 ppm at a temperature $\leq 1100°$ C. to enhance insulation resistance of the dielectric.

It has been found that the multilayer ceramic capacitors of the present invention exhibit a very high dielectric constant and perform well in highly accelerated life testing conditions, and also exhibit a high breakdown voltage in a DC field. Under the highly stressed conditions consisting of an applied DC field of 40 volts/$\mu$m and. 150° C., the ceramic capacitors demonstrate a characteristic life up to 10 hours. The dielectric constant is greater than 3200 and the dissipation factor is less than 3.0% at 25° C. when measured at 1 volt RMS. The temperature coefficient of capacitance is within 12% over the temperature range of −55° C. to +125° C.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
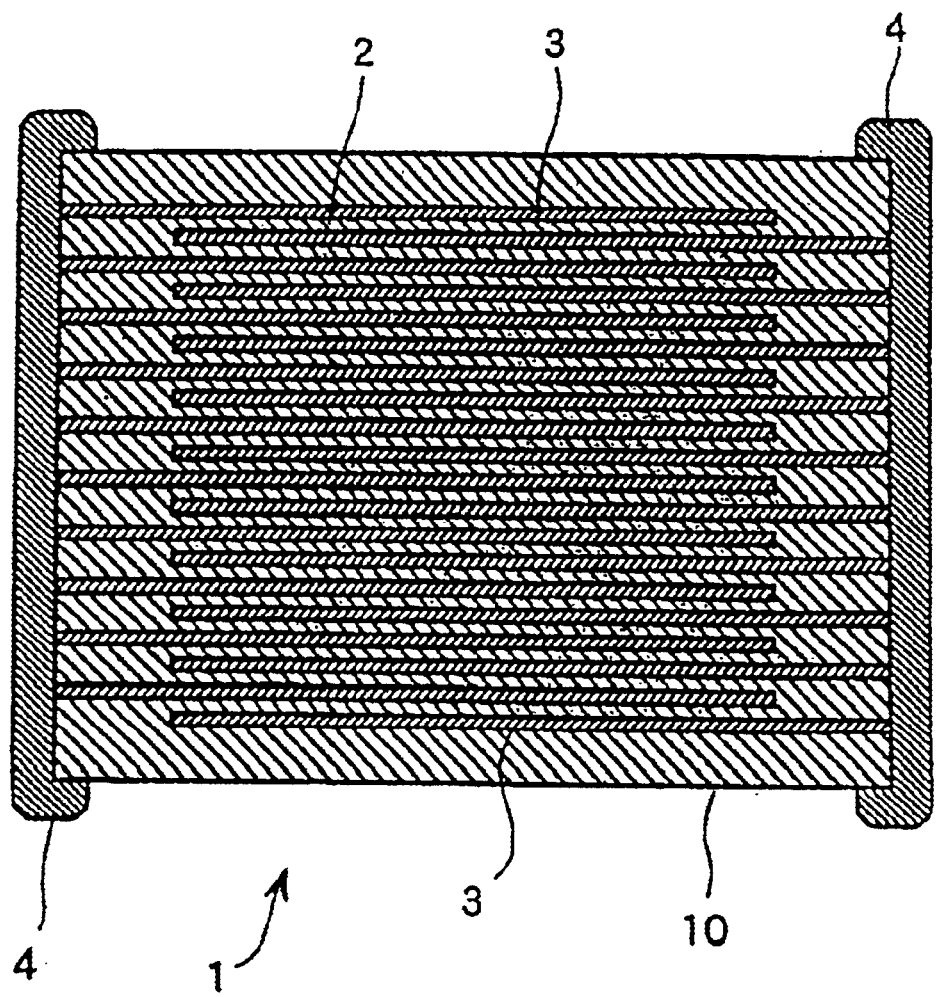
FIG. 1 is an elevational cross-sectional view of a multilayer ceramic chip capacitor according to a preferred embodiment of the invention.

The configuration of multilayer ceramic capacitors is well known in the art. With reference to FIG. 1, an exemplary structure of a multilayer ceramic chip capacitor 1 is shown. External electrodes 4 of the capacitor 1 are disposed on side surfaces of the capacitor chip 10 and in electrical connection with internal electrode layers 3. The capacitor chip 10 has a plurality of alternately stacked dielectric layers 2. The shape of the capacitor chip 10 is not critical although it is often rectangular shaped. Also, the size is not critical and the chip may have appropriate dimensions in accordance with a particular application, typically in the range of 1.0 to 5.6 mm×0.5 to 5.0 mm×0.5 to 1.9 mm. The internal electrode layers 3 are stacked such that at opposite ends they are alternately exposed at opposite side surfaces of the chip 10. That is, the internal electrode layers 3 of one group are exposed at one side surface of the chip 10 and the internal electrode layers 3 of another group are exposed at the opposite side surface of the chip 10. One external electrode 4 is applied to one side chip of the capacitor chip 10 in electrical contact with the internal electrode layers 3 of the one group, and the other external electrode 4 is applied to the opposite side surface of the chip 10 in electrical contact with the internal electrode layers 3 of the other group. A desired capacitor circuit is completed in this way.

The dielectric layers are formed of a dielectric material containing barium titanate as a major component and manganese oxide, yttrium oxide, holmium oxide, calcium carbonate, silicon oxide, boron oxide, aluminum oxide, magnesium oxide, and calcium oxide as minor components. Preferably, these components are contained in such a proportion that there are present: about 99.80 to about 90.00 wt. %, and more preferably about 99 to about 98.5 wt. % $BaTiO_3$; about 0.067 to about 3.364 wt. %, and more preferably about 0.336 to about 0.505 wt. % $Mn_3O_4$; about 0.040 to about 1.976 wt. %, and more preferably about 0.198 to about 0.296 wt. % $Y_2O_3$; about 0.026 to about 1.320 wt. %, and more preferably about 0.132 to about 0.198 wt. % $Ho_2O_3$; about 0.040 to about 1.993 wt. %, and more preferably about 0.199 to about 0.299 wt. % $CaCO_3$; about 0.011 to about 0.567 wt. %, and more preferably about 0.057 to about 0.085 wt. % $SiO_2$; about 0.008 to about 0.389 wt. %, and more preferably about 0.039 to about 0.058 wt. % $B_2O_3$; about 0.004 to about 0.179 wt. %, and more preferably about 0.018 to about 0.027 wt. % $Al_2O_3$; about 0.003 to about 0.164 wt. %, and more preferably about 0.016 to about 0.025 wt. % MgO; and about 0.001 to about 0.047 wt. %, and more preferably about 0.005 to about 0.007 wt. % CaO.

As will be understood by those skilled in the art, "precursor" is defined as including carbonates, hydroxides, oxalates, acetates, etc. However the barium titanate, manganese oxide, yttrium oxide, holmium oxide, calcium carbonate, silicon oxide, boron oxide, aluminum oxide, magnesium oxide and calcium oxide are calculated as $BaTiO_3$, $Mn_3O_4$, $Y_2O_3$, $Ho_2O_3$, $CaCO_3$, $SiO_2$ $B_2O_3$, $Al_2O_3$ MgO and CaO, respectively. Preferably, the $SiO_2$, $B_2O_3$, $Al_2O_3$, MgO and CaO present in the dielectric composition are provided in the form of pre-melted glass frit, which improves insulation resistance and plating resistance as well as densification of dielectric. The oxidation state of each oxide is not critical insofar as the contents of metal elements constituting the respective oxides are within the above-identified ranges.

Other compounds may be contained in the dielectric material provided that the other compound does not adversely affect dielectric properties. It is preferable to avoid adding amounts of MgO greater than the 0.082 wt. % of the dielectric composition. The presence of greater than 0.082 wt. % of magnesium oxide in the dielectric composition tends to depress the TCC at 125° C. to a value outside of X7R limits.

Described below are the reasons for the limitation of the contents of the respective minor components. Yttrium oxide is effective for improving the accelerated life of IR and DC bias performance. The DC bias performance becomes poor with yttrium oxide contents of 0.04 wt. % or less on the above-identified basis. Yttrium oxide contents above the above-identified range result in a reduced dielectric constant and can detract from sinterability, leading to less densification.

Contents of $SiO_2$ below the above-identified range drastically detracts from sinterability and thus leads to less densification, whereas larger contents beyond the range lead to a lowering of the initial insulation resistance. Manganese oxide is effective for densification of dielectric layers and improving an accelerated life of IR. When the manganese oxide content is greater than the above-identified range, it is difficult to reduce a change of capacitance with time upon application of a DC electric field. To be fully effective, manganese oxide should be contained in an amount of at least 0.67 wt. % on the same basis.

The dielectric layers may have any desired mean grain size. By limiting the dielectric material to the above-defined composition, there are obtained fine crystal grains that typically have a mean grain size of about 0.2 to about 0.7 $\mu$m, with a grain size of about 0.4 $\mu$m being preferred.

The dielectric layers have an appropriate Curie temperature that is determined in accordance with the applicable standards by suitably selecting a particular composition of dielectric material. Typically the Curie temperature is higher than 45° C., preferably about 65° C. to about 125° C.

Each dielectric layer preferably has a thickness of up to about 50 $\mu$m, more preferably up to about 20 $\mu$m. The lower limit of thickness is about 0.5 $\mu$m, preferably about 2 $\mu$m. The present invention is effectively applicable to multilayer ceramic chip capacitors having such thin dielectric layers for minimizing a change of their capacitance with time. The number of dielectric layers stacked is generally from about 2 to about 600, and more preferably from about 2 to about 400.

The conductor that forms the internal electrode layers 3 is not critical, although a base metal preferably is used since the dielectric material of the dielectric layers 2 has anti-reducing properties. Typical base metals are nickel and nickel alloys. Preferred nickel alloys are alloys of nickel with at least one member selected from Mn, Cr, Co, Cu and Al, with such nickel alloys containing at least 95 wt. % of nickel being more preferred. It is to be noted that nickel and nickel alloys may contain up to about 0.1 wt. % of phosphorous and other trace components.

The thickness of the internal electrode layers may be suitably determined in accordance with a particular purpose and application although its upper limit is typically about 5 $\mu$m, and more preferably about 2.5 $\mu$m, and its lower limit is typically about 0.5 $\mu$m, and more preferably about 1 $\mu$m.

The conductor that forms the external electrodes 4 is not critical, although inexpensive metals such as nickel, copper, and alloys thereof are preferred. The thickness of the external electrodes may be suitably determined in accordance with a particular purpose and application although it generally ranges from about 10 $\mu$m to about 50 $\mu$m.

The multilayer ceramic chip capacitor of the present invention generally is fabricated by forming a green chip by conventional printing and sheeting methods using pastes, firing the chip, and printing or transferring external electrodes thereto followed by baking.

A paste for forming the dielectric layers can be obtained by mixing a raw dielectric material with an organic vehicle. The raw dielectric material may be a mixture of oxides and composite oxides as previously mentioned. Also useful are various compounds that convert to such oxides and composite oxides upon firing. These include, for example, carbonates, oxalates, nitrates, hydroxides, and organometallic compounds. Preferably, compounds containing these oxides, or precursor of these oxides, are selected and mixed in the appropriate proportion to obtain the raw dielectric material. The proportion of such compounds in the raw dielectric material is determined such that after firing, the specific dielectric layer composition may be met. The raw dielectric material is generally used in powder form having a mean particle size of about 0.1 to about 3 $\mu$m, and more preferably about 1 $\mu$m or less.

The organic vehicle is a binder in an organic solvent. The binder used herein is not critical and may be suitably selected from conventional binders such as ethyl cellulose and polyvinyl butanol. Also the organic solvent used herein is not critical and may be suitably selected from conventional organic solvents such as terpineol, butylcarbinol, acetone, and toluene in accordance with a particular application method such as a printing or sheeting method.

A paste for forming internal electrode layers is obtained by mixing an electro-conductive material with an organic vehicle. The conductive material used herein includes conductors such as conductive metals and alloys as mentioned above and various compounds which convert into such conductors upon firing, for example, oxides, organometallic compounds and resinates. The organic vehicle is as mentioned above. An example of a suitable paste is EL51-012 nickel paste from Ferro Corporation. Paste for forming external electrodes is prepared by the same method as the internal electrodes layer-forming paste.

No particular limit is imposed on the organic vehicle content of the respective pastes mentioned above. Often the paste contains about 1 to 5 wt. % of the binder and about 10 to 50 wt. % of the organic solvent. If desired, the respective pastes may contain any other additives such as dispersants, plasticizers, dielectric compounds, and insulating compounds. The total content of these additives is preferably up to about 10 wt. %.

A green chip then may be prepared from the dielectric layer-forming paste and the internal electrode layer-forming paste. In the case of printing method, a green chip is prepared by alternately printing the pastes onto a substrate of a polyester film, an example of which is polyethylene terephthalate (PET), in laminar form, cutting the laminar stack to a predetermined shape and separating it from the substrate. Also useful is a sheeting method wherein a green chip is prepared by forming green sheets from the dielectric layer-forming paste, printing the internal electrode layer-forming paste on the respective green sheets, and stacking the printed green sheets. The binder is then removed from the green chip and fired. Binder removal may be carried out under conventional conditions, preferably under the following conditions where the internal electrode layers are formed of a base metal conductor such as nickel and nickel alloys:

Heating rate: 0.01° C. to 20° C./hour, more preferably 0.03 to 0.1° C./hour;

Holding temperature: 150° C. to 300° C., more preferably 250° C.;

Holding time: 30 minutes to 700 minutes, more preferably 200 minutes; and

Atmosphere: Air.

The green chip is then fired in an atmosphere that may be determined in accordance with the type of conductor in the internal electrode layer-forming paste. Where the internal electrode layers are formed of a base metal conductor such as nickel and nickel alloys, the firing atmosphere may have an oxygen partial pressure of $10^{-8}$, to $10^{-12}$ atm. Extremely low oxygen partial pressure should be avoided, since at such low pressures the conductor can be abnormally sintered and may become disconnected from the dielectric layers. At oxygen partial pressures above the range, the internal electrode layers are likely to be oxidized.

For firing, the chip preferably is held at a temperature of from about 800° C. to about 1200° C., more preferably 900° C. to 1100° C., for about two hours to ensure that any remnant binder is removed. Next, the temperature is raised to a peak temperature of from about 1100° C. to about 1400° C., more preferably from about 1200° C. to about 1300° C. The temperature is held for about two hours to enhance densification. Lower holding temperatures below the range would provide insufficient densification whereas higher holding temperatures above the range can lead to poor DC bias performance. The firing atmosphere preferably is a reducing atmosphere. An exemplary atmospheric gas is wet $N_2$, or a humidified mixture of $N_2$ and $H_2$ gases. Remaining conditions for sintering preferably are as follows:

Heating rate: 50° C. to 500° C./hour, more preferably 200° C. to 300° C./hour;

Holding time: ½ to 8 hours, more preferably 1 to 3 hours; and

Cooling rate: 50° C. to 500° C./hour, more preferably 200° C. to 300° C./hour.

An annealing step is preferably performed after the capacitor chip has been fired in a reducing atmosphere. Annealing is effective for re-oxidizing the dielectric layers, thereby optimizing the resistance of the ceramic to dielectric breakdown. Firing in a reducing atmosphere removes oxygen ($O_2$) from the dielectric. Re-oxidation is effective to introduce a limited amount of oxygen into the dielectric layers to compensate for oxygen vacancies inevitably formed during firing in the oxygen deficient atmosphere. These oxygen vacancies allow charge to move through the dielectric, thereby decreasing the dielectric properties of the dielectric composition. Therefore, the re-oxidation process improves insulation resistance.

The annealing atmosphere may have an oxygen partial pressure of at least $10^{-6}$ atm., preferably $10^{-5}$ to $10^{-4}$ atm. The dielectric layers are not sufficiently re-oxidized at low oxygen partial pressures below the range, whereas the internal electrode layers are likely to be oxidized at oxygen partial pressures above this range.

For annealing, the chip is held at a temperature of lower than 1200° C., more preferably 700° C. to 1100° C.

Lower holding temperatures below the range would oxidize the dielectric layers to a lesser extent, thereby leading to a shorter life. Higher holding temperatures above the range can cause the internal electrode layers to be oxidized (leading to a reduced capacitance) and to react with the dielectric material (leading to a shorter life). Annealing can be accomplished simply by heating and cooling. In this case, the holding temperature is equal to the highest temperature on heating and the holding time is zero. Remaining conditions for annealing preferably are as follows:

Holding time: 0 to 20 hours, more preferably 2 to 10 hours; and

Cooling rate: 50° C. to 500° C./hour, more preferably 100 to 300° C./hour.

The preferred atmospheric gas for annealing a dry mixture of nitrogen gas and air.

The binder removal, firing, and annealing may be carried out either continuously or separately. If done continuously, the process includes the steps of binder removal, changing only the atmosphere without cooling, raising the temperature to the firing temperature, holding the chip at that temperature for firing, lowering the temperature to the annealing temperature, changing the atmosphere at that temperature, and annealing.

If done separately, after binder removal and cooling down, the temperature of the chip is raised to the binder-removing temperature in dry or humid nitrogen gas. The atmosphere then is changed to a reducing one, and the temperature is further raised for firing. Thereafter, the temperature is lowered to the annealing temperature and the atmosphere is again changed to dry or humid nitrogen gas, and cooling is continued. Alternately, once cooled down, the temperature may be raised to the annealing temperature in a nitrogen gas atmosphere. The entire annealing step may be done in a humid nitrogen gas atmosphere.

The resulting chip may be polished at end faces by barrel tumbling and sand blasting, for example, before the external electrode-forming paste is printed or transferred and baked to form external electrodes. Firing of the external electrode-forming paste may be carried out under the following conditions: a dry nitrogen atmosphere (about $10^{-6} O_2$ partial pressure), about 600° C. to 800° C., and about 10 minutes to about 1 hour.

If necessary, pads are formed on the external electrodes by plating or other methods known in the art. The multilayer ceramic chip capacitors of the invention can be mounted on printed circuit boards, for example, by soldering. During operation of the multilayer ceramic chip capacitors of the invention, a DC electric field of at least 0.02 V/$\mu$m, often at least 0.2 V/$\mu$m, more often at least 0.5 V/$\mu$m, and generally up to about 5 V/$\mu$m is applied to the dielectric layers as well as an overlapping AC component. The capacitors exhibit a minimized change of their capacitance over time, even when such a DC electric field is applied.

EXAMPLE 1

The following example is provided to illustrate preferred aspects of the invention and is not intended to limit the scope of the invention. Three dielectric compositions identified as Samples 1, 2 and 3, respectively, were formed by blending appropriate amounts of $BaTiO_3$, $Mn_3O_4$, $Y_2O_3$, $Ho_2O_3$ and $CaCO_3$ to arrive at the wt. % percentage shown in Table 1 below. The powders had an average particle size of 0.5 to 1 $\mu$m. A glass frit powder sold by Ferro Corporation of Cleveland, Ohio as EG0024 was added to the blend of dielectric powder. This glass frit has the following composition:

SiO$_2$: 42.1 wt. %;
B$_2$O$_3$: 28.9 wt. %;
Al$_2$O$_3$: 13.3 wt. %;
MgO: 12.2 wt. %; and
CaO: 3.5 wt. %.

The addition of the glass frit was followed by wet milling the selected components with a binder system comprising polyvinyl butanol sold by Ferro Corporation of Cleveland, Ohio under the trade designation PVB. For 100 grams of powder 28.8 grams of binder was added for tape preparation. The components were wet milled in a ball mill for 24 hours and the wet slip thus formed was coated on a polyester film to form dielectric green tapes. The thicknesses of the dielectric green tapes were processed in the range of 5 to 15 μm depending on the specific testing which was to be performed on them. Nickel electrodes were printed onto the dried green dielectric tape by conventional screen printing methods using a nickel paste from Ferro Corporation of Cleveland, Ohio sold under the trade designation EL51-012.

Typically, a total of 10 sheets were stacked and bonded under pressure and heat to form a green chip. After dicing to a 1206 part size, the green chip was heated to remove the binder and then was fired and re-oxidized a Tokai Konetsu Kyogo batch kiln under the following process conditions to obtain a multilayer capacitor chip:
  Binder removal:
    Heating rate: 0.03 to 2° C./hour;
    Holding temperature: 250° C.;
    Holding time: 200 minutes;
    Atmosphere: Air;
  Firing:
    Heating rate: 3.3° C./min;
    Holding temperature: 1000° C.:
    Holding time: 2 hrs.;
    Heating rate: 3.3° C./min;
    Holding temperature: peak 1275° C.;
    Holding time: 2 hrs.;
    Atmosphere: Oxygen partial pressure typically 10$^{-9}$ atmospheres;
    Cooling rate: 5° C./min;
  Re-oxidation:
    Holding temperature: 100° C.:
    Holding time: 3 to 9 hrs.;
    Atmosphere: 6 to 60 ppm; and Cooling rate: 2° C./min.

For humidifying the atmospheric gases, a wetter was used with a water temperature of 25° C. to 35° C. The chip thus obtained was corner rounded by tumbling. An external electrode forming copper paste available as TM50-081 from Ferro Corporation of Cleveland, Ohio was applied to the end faces and fired in a dry nitrogen atmosphere at 775° C. for about 70 minutes to form external electrodes. The multilayer capacitor thus processed had dimensions of 3.2 mm×1.6 mm with variable thickness. The dielectric layers were 3 to 11 μm, and the internal nickel electrode layers were 1.5 to 2.5 μm thick. The composition of dielectric layers for each sample is shown in Table 1.

TABLE 1

| | Dielectric Composition | | | | | | | | |
|---|---|---|---|---|---|---|---|---|---|
| | From Powders (wt. %) | | | | | From Glass Frit (wt. %) | | | |
| Sample | BaTiO$_3$ | Mn$_3$O$_4$ | Y$_2$O$_3$ | Ho$_2$O$_3$ | CaCO$_3$ | SiO$_2$ | B$_2$O$_3$ | Al$_2$O$_3$ | MgO | CaO |
| 1 | 99 | 0.336 | 0.198 | 0.132 | 0.199 | 0.057 | 0.039 | 0.018 | 0.016 | 0.005 |
| 2 | 98.75 | 0.421 | 0.247 | 0.165 | 0.249 | 0.071 | 0.049 | 0.022 | 0.021 | 0.006 |
| 3 | 98.5 | 0.505 | 0.296 | 0.198 | 0.299 | 0.085 | 0.058 | 0.027 | 0.025 | 0.007 |

The electrical properties of the dielectric were measured by the standard procedures oulined in the EIA specifications. The electrical properties of each sample are illustrated in Table 2.

TABLE 2

| | Electrical Properties | | | | | | | |
|---|---|---|---|---|---|---|---|---|
| | | | RC(ΩF) | RC(ΩF) | DBV (volt/ | Aging | HALT (150C/ | TCC (%) | |
| Sample | ε | tanδ(%) | 25° C. | 125° C. | μm) | (%/dec.) | 40 V/μm) | −55° C. | 125° C. |
| 1 | 4000 | 2.7 | 1150 | 35 | 60 | 5 | 1.8 | −15 | −2 |
| 2 | 3500 | 2 | 850 | 25 | 60 | 3.6 | 3.5 | −13 | −7 |
| 3 | 3200 | 1.7 | 700 | 17 | 60 | 2.8 | 10.6 | −10 | −9 |

All samples meet the X7R temperature coefficient of capacitance characteristics. Insulation resistance of samples within the scope of invention is high and the characteristic life of samples lasted up to 10 hours tested at highly accelerated conditions at 150° C. and at field of 40 V/μm. The mean time to failure of samples extends to longer times by increasing the amount of additive mixture.

EXAMPLE 2

Figure 2:
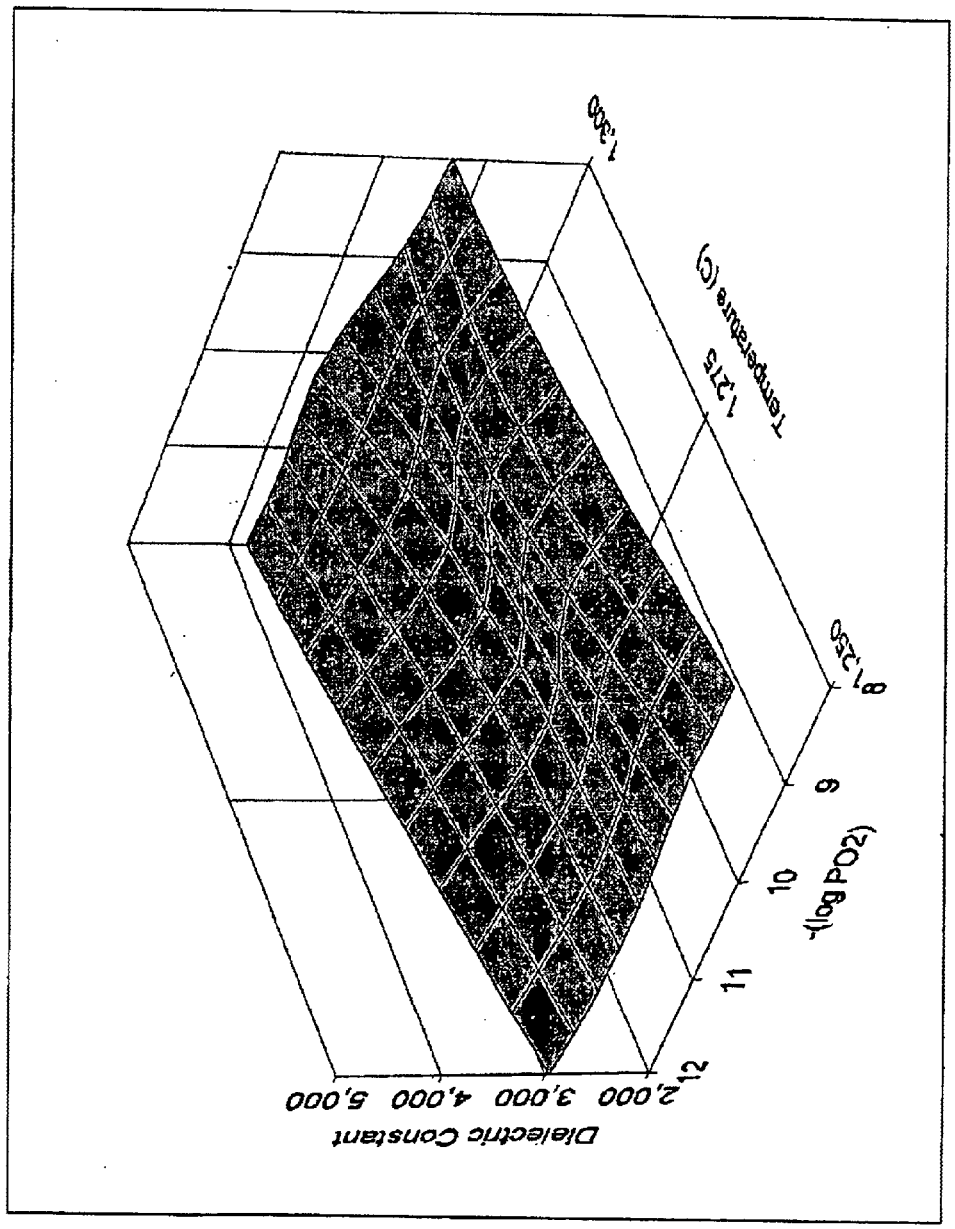
FIG. 2 is a graph showing the dielectric constant of a dielectric composition in accordance with the invention as a function of firing conditions.
Figure 3:
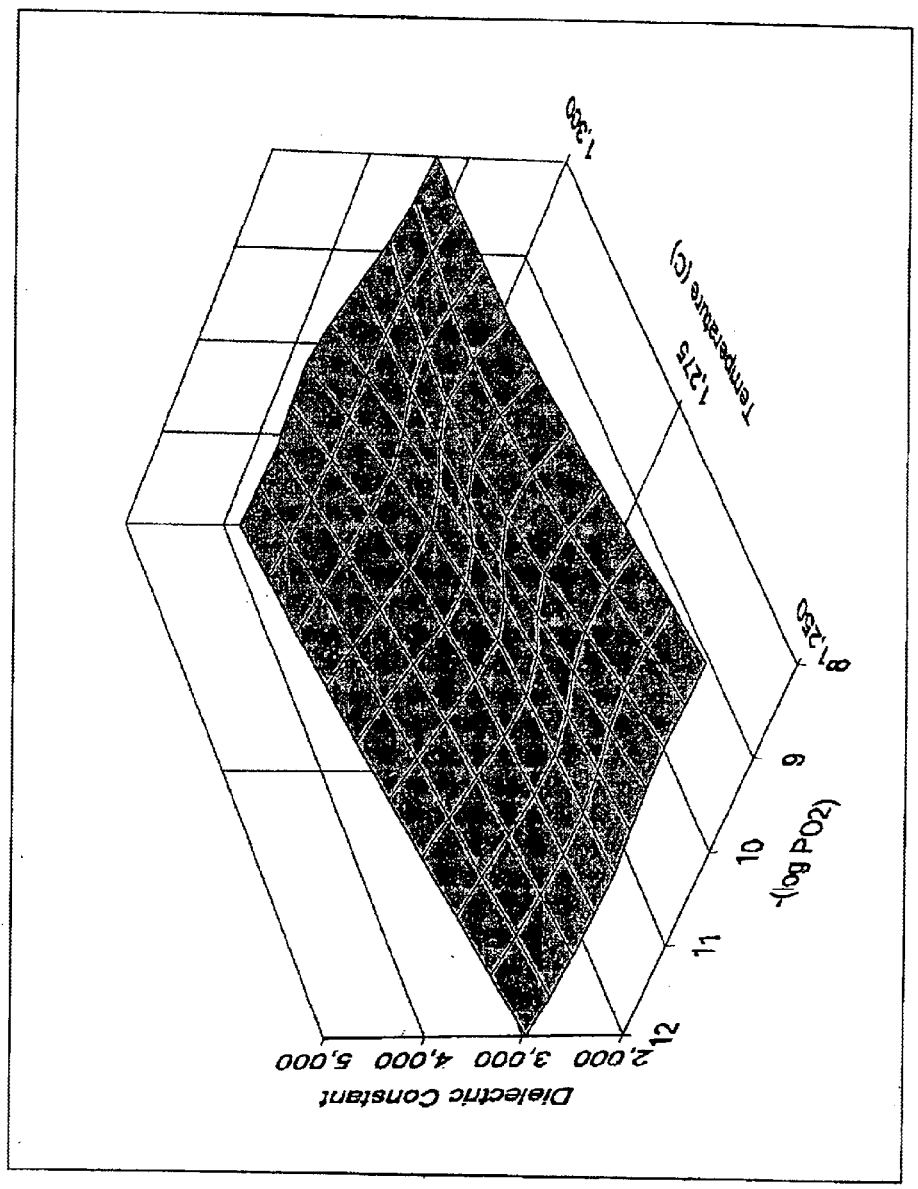
FIG. 3 is a graph showing the dissipation factor of a dielectric composition in accordance with the invention as a function of firing conditions.

The dielectric composition identified as Sample 2 in Example 1 was formed into green chips, which were individually fired at various firing temperatures within the range of 1275 to 1325° C. and in the range of oxygen partial pressure $10^{-8}$ to $10^{-12}$ atmospheres. FIGS. 2 through 5 graphically illustrate the dielectric properties of green chips formed from the dielectric composition disclosed in Sample 2 from Example 1 as a function of firing temperature and atmosphere. As shown in FIG. 2, the dielectric constant remains higher than 3500 in the firing temperature. Dissipation factor as a function of firing conditions is illustrated in FIG. 3. Dissipation factor remains less than 4% in the wide range of firing temperatures between 1275 and 1325° C. and in the range of oxygen partial pressures from $10^{-8}$ to $10^{-10}$ atmospheres.

Figure 4:
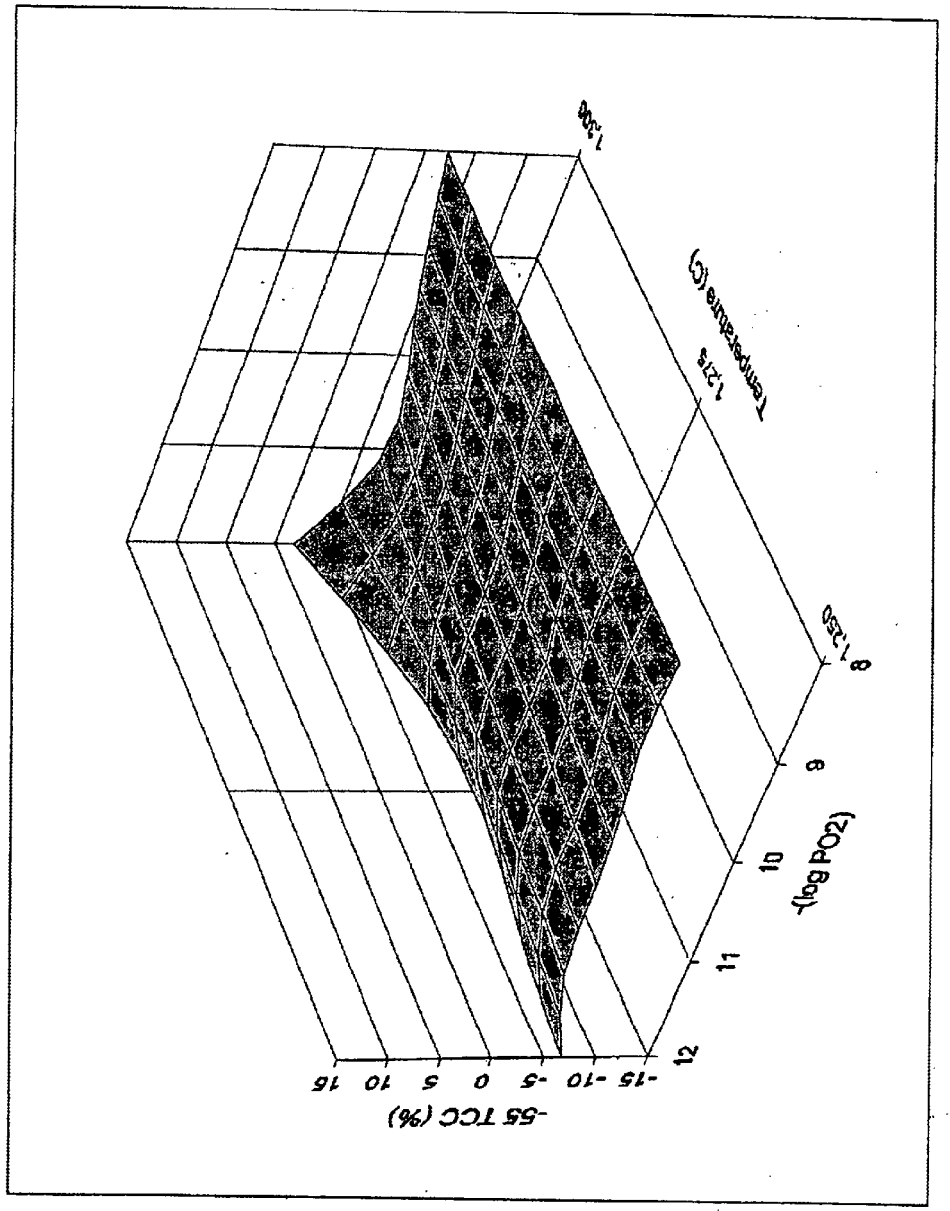
FIG. 4 is a graph showing the −55° C. TCC of a dielectric composition in accordance with the invention as a function of firing conditions.
Figure 5:
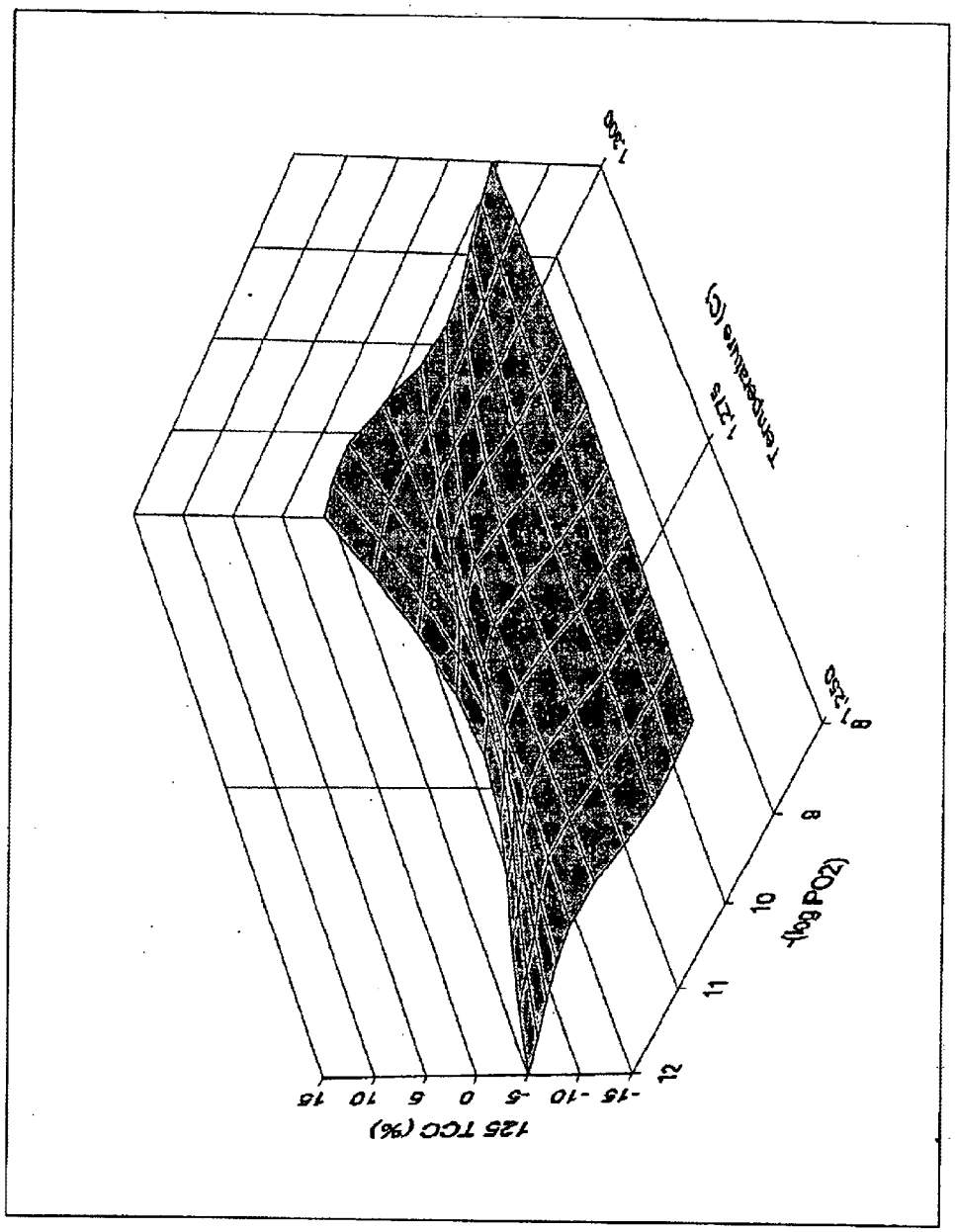
FIG. 5 is a graph showing the 125° C. TCC of a dielectric composition in accordance with the invention as a function of firing conditions.

FIGS. 4 and 5 illustrate the change of capacitance at −55° C. and 125° C. as a function of processing temperature and atmosphere, and very stable TCC characteristics are shown. Capacitance change is between 0 and −10% at −55° C. and capacitance change is less than 5% at 125° C. in the whole range of firing temperature and atmosphere. Electric properties, ultra fine microstructure, and a wide range of processability indicate that the dielectric composition of the invention is very suitable for high capacitance multilayer capacitor applications with a dielectric thickness thinner than 3 μm and an active layer count of more than 300 layers.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A composition for use in forming a dielectric material for use in a multilayer ceramic chip capacitor comprising a sintered blend of:
   from about 99.8 to about 90.00 wt. % $BaTiO_3$;
   from about 0.067 to about 3.364 wt. % $Mn_3O_4$;
   from about 0.040 to about 1.976 wt. % $Y_2O_3$;
   from about 0.026 to about 1.320 wt. % $Ho_2O_3$;
   from about 0.040 to about 1.993 wt. % $CaCO_3$;
   from about 0.011 to about 0.567 wt. % $SiO_2$;
   from about 0.008 to about 0.389 wt. % $B_2O_3$;
   from about 0.004 to about 0.179 wt. % $Al_2O_3$;
   from about 0.003 to about 0.164 wt. % MgO; and
   from about 0.001 to about 0.047 wt. % CaO.

2. The composition as defined in claim 1 wherein prior to sintering, the dielectric material comprises a blend of powders of $BaTiO_3$, $Mn_3O_4$, $Y_2O_3$, $Ho_2O_3$, $CaCO_3$ and a glass frit comprising $SiO_2$, $B_2O_3$, $Al_2O_3$, MgO, and CaO.

3. A multilayer ceramic chip capacitor comprising alternately stacked layers of a dielectric material and an internal electrode material comprising nickel, the dielectric material comprising a sintered blend of:
   from about 99.8 to about 90.00 wt. % $BaTiO_3$;
   from about 0.067 to about 3.364 wt. % $Mn_3O_4$;
   from about 0.040 to about 1.976 wt. % $Y_2O_3$;
   from about 0.026 to about 1.320 wt. % $Ho_2O_3$;
   from about 0.040 to about 1.993 wt. % $CaCO_3$;
   from about 0.011 to about 0.567 wt. % $SiO_2$;
   from about 0.008 to about 0.389 wt. % $B_2O_3$;
   from about 0.004 to about 0.179 wt. % $Al_2O_3$;
   from about 0.003 to about 0.164 wt. % MgO; and
   from about 0.001 to about 0.047 wt. % CaO.

4. The multilayer ceramic chip capacitor as defined in claim 3 wherein prior to sintering, the dielectric material comprises a blend of powders of $BaTiO_3$, $Mn_3O_4$, $Y_2O_3$, $Ho_2O_3$, $CaCO_3$ and a glass frit comprising $SiO_2$, $B_2O_3$, $Al_2O_3$, MgO, and CaO.

5. The multilayer ceramic chip capacitor as defined in claim 4 wherein the dielectric material is produced by wet milling of $BaTiO_3$, $Mn_3O_4$, $Y_2O_3$, $Ho_2O_3$, $CaCO_3$ powders with the glass frit and a binder system.

6. The multilayer ceramic chip capacitor as defined in claim 5 wherein the binder system comprises polyvinyl butanol.

7. The multilayer ceramic chip capacitor as defined in claim 3 wherein the internal electrode material comprises an alloy comprising a major part of nickel and a minor part of copper.

8. The multilayer ceramic chip capacitor as defined in claim 3 wherein the dielectric material maintains a dielectric constant of from about 3200 to about 4000.

9. The multilayer ceramic chip capacitor as defined in claim 3 wherein the $BaTiO_3$, $Mn_3O_4$, $Y_2O_3$, $Ho_2O_3$, $CaCO_3$ powders, have a particle size from about 0.5 μm to about 1 μm.

10. The multilayer ceramic chip capacitor as defined in claim 3 wherein the dielectric material comprises:
    from about 99.8 to about 90.00 wt. % $BaTiO_3$;
    from about 0.067 to about 3.364 wt. % $Mn_3O_4$;
    from about 0.040 to about 1.976 wt. % $Y_2O_3$;
    from about 0.026 to about 1.320 wt. % $Ho_2O_3$;
    from about 0.040 to about 1.993 wt. % $CaCO_3$;
    from about 0.011 to about 0.567 wt. % $SiO_2$;
    from about 0.008 to about 0.389 wt. % $B_2O_3$;
    from about 0.004 to about 0.179 wt. % $Al_2O_3$;
    from about 0.003 to about 0.164 wt. % MgO; and
    from about 0.001 to about 0.047 wt. % CaO.

11. A method of fabricating a multilayer ceramic chip capacitor having X7R characteristics comprising:
    providing a dielectric material comprising:
       from about 99.8 to about 90.00 wt. % $BaTiO_3$;
       from about 0.067 to about 3.364 wt. % $Mn_3O_4$;
       from about 0.040 to about 1.976 wt. % $Y_2O_3$;
       from about 0.026 to about 1.320 wt. % $Ho_2O_3$;
       from about 0.040 to about 1.993 wt. % $CaCO_3$;
       from about 0.011 to about 0.567 wt. % $SiO_2$;
       from about 0.008 to about 0.389 wt. % $B_2O_3$;
       from about 0.004 to about 0.179 wt. % $Al_2O_3$;
       from about 0.003 to about 0.164 wt. % MgO; and
       from about 0.001 to about 0.047 wt. % CaO;
    forming alternate stacked layers of said dielectric material with an internal electrode material comprising nickel;
    applying heat and pressure to form a green chip; and
    forming capacitors from said green chip.

12. The method of fabricating a multilayer ceramic chip capacitor having X7R characteristics as defined in claim 11 wherein the internal electrode material comprises an alloy comprising a major part of nickel and a minor part of copper.

13. The method of fabricating a multilayer ceramic chip capacitor having X7R characteristics as defined in claim 11 wherein prior to sintering, the dielectric material comprises a blend of powders of $BaTiO_3$, $Mn_3O_4$, $Y_2O_3$, $Ho_2O_3$, $CaCO_3$ powders, and a glass frit comprising $SiO_2$, $B_2O_3$, $Al_2O_3$, MgO, and CaO.

14. The method of fabricating a multilayer ceramic chip capacitor having X7R characteristics as defined in claim 11 additionally comprising external electrodes comprising copper.

15. The method of fabricating a multilayer ceramic chip capacitor having X7R characteristics as defined in claim 11 wherein the dielectric material maintains a dielectric constant of from about 3200 to about 4000.

16. The method of fabricating a multilayer ceramic chip capacitor having X7R characteristics as defined in claim 11 wherein the $BaTiO_3$, $Mn_3O_4$, $Y_2O_3$, $Ho_2O_3$, $CaCO_3$ powders have a particle size of from about 0.5 μm to about 1 μm.

* * * * *